(12) United States Patent
Chen et al.

(10) Patent No.: US 9,977,127 B2
(45) Date of Patent: May 22, 2018

(54) SHIP DRAUGHT DETECTION APPARATUS AND ITS DETECTION METHOD

(71) Applicant: HoHai University, Nanjing, Jiangsu (CN)

(72) Inventors: Da Chen, Jiangsu (CN); Baodong Lou, Jiangsu (CN); Shuitao Gu, Jiangsu (CN); Feng Ouyang, Jiangsu (CN); Lijun Hou, Jiangsu (CN); Ning Zhuang, Jiangsu (CN)

(73) Assignee: HOHAI University, Nanjiang, Jiangsu (CN)

(*) Notice: Subject to any disclaimer, the term of this patent is extended or adjusted under 35 U.S.C. 154(b) by 70 days.

(21) Appl. No.: 15/356,520

(22) Filed: Nov. 18, 2016

(65) Prior Publication Data
US 2018/0011191 A1    Jan. 11, 2018

(30) Foreign Application Priority Data

Jul. 6, 2016    (CN) .......................... 2016 1 05283665

(51) Int. Cl.
*G01S 15/08* (2006.01)
*B63B 39/12* (2006.01)
*G01S 15/42* (2006.01)

(52) U.S. Cl.
CPC .............. *G01S 15/08* (2013.01); *B63B 39/12* (2013.01); *G01S 15/42* (2013.01)

(58) Field of Classification Search
CPC .......... G01S 15/08; G01S 15/42; G01S 15/88; G01S 15/93; B63B 39/12
See application file for complete search history.

(56) References Cited

U.S. PATENT DOCUMENTS

| 4,208,731 A * | 6/1980 | Desbrandes ........... B63B 35/086 367/11 |
| 6,317,387 B1 * | 11/2001 | D'Amaddio ............ G01N 29/11 114/222 |
| 6,840,187 B2 * | 1/2005 | Tible ....................... B63B 59/10 114/222 |

(Continued)

*Primary Examiner* — Nicholas Kiswanto
(74) *Attorney, Agent, or Firm* — Lei Fang & Associates LLC; Lei Fang, Esq.

(57) ABSTRACT

The present invention discloses a ship draught detection apparatus and its detection method. The ship draught detection apparatus includes two servo motors, a guide rail, a sonar detection device, a traction device, a locating device, and a control device. Compared with the provision of a series of sonar detection devices in the prior art, the provision of one sonar detection device reduces the cost and there is no mutual interference between adjacent sonars. Meanwhile, because a lock gate width of a ship lock is greater than a width of the ship, in order to improve the detection precision, the locating device is configured to predict in advance an accurate position of the ship when passing the ship lock according to the position of the ship and the orientation of a ship bow, and the control device controls the rotation speed and the direction of the two servo motors, and makes the sonar detection device move along the guide rail through the ropes, so that the sonar detection device is located just below the ship when the ship passes the ship lock, thereby improving the detection precision.

10 Claims, 2 Drawing Sheets

(56) References Cited

U.S. PATENT DOCUMENTS

| | | | | |
|---|---|---|---|---|
| 7,209,540 B2 * | 4/2007 | Muhanna | ............ | G01V 5/0016 |
| | | | | 378/57 |
| 7,301,851 B1 * | 11/2007 | Mixon | .................... | G01S 15/88 |
| | | | | 367/11 |
| 8,395,779 B2 * | 3/2013 | Harkey | .................... | G01S 17/89 |
| | | | | 356/237.3 |
| 8,570,185 B2 * | 10/2013 | Rhodes | ................ | H04B 13/02 |
| | | | | 340/850 |
| 2006/0114748 A1 * | 6/2006 | Rogers | .................... | G01S 15/89 |
| | | | | 367/88 |
| 2008/0260467 A1 * | 10/2008 | Kroecker | ................ | B63B 35/44 |
| | | | | 405/195.1 |
| 2009/0112510 A1 * | 4/2009 | Crane | .................... | G01B 21/18 |
| | | | | 702/166 |

* cited by examiner

SHIP DRAUGHT DETECTION APPARATUS AND ITS DETECTION METHOD

CROSS-REFERENCE TO RELATED APPLICATIONS

This application claims benefit and priority to Chinese patent application No. 2016105283665, which was filed on Jul. 5, 2016; the contents of which are incorporated by reference herein in its entirety.

BACKGROUND OF THE INVENTION

Field of the Invention

The present invention relates to the technical field of ship draught measurement, and more specifically to a ship draught detection apparatus and its detection method.

Description of Related Art

The "super draught" of a ship means that the draught depth of the ship exceeds the allowed maximum safety depth of a ship lock. The "super draught" is the most common and direct threat to the safety of the operation of a ship lock nowadays, which may lead to the stranding of the ship and traffic jam, or more seriously, lead to the damage to the ship lock, thus posing serious safety threat to the dam construction. Hydropower stations, in the navigation management process thereof, usually experience the accident of stranding of the ship passing the dam at the lock due to such actions, thereby posing great threat to the safety of the crew, shipping lane, and dam construction, causing disputes, and affecting the implementation of the normal traffic scheduling.

To solve the above problem, a CN patent application No. 201510363477.0, entitled DETECTION METHOD OF SHIP DRAUGHT BASED ON PARALLEL MULTI-BEAM SONAR, discloses multiple sonar signal generator arrays and receiver arrays installed at a proper height at both sides of a ship lock or an approach channel of the ship lock. When a ship passes by, for the reason the hull is blocked, several receivers in an elevation range from the water surface to the ship bottom cannot receive signals, and thus the actual draught of the ship is deduced according to the position of the available receiver being in proximity to the ship's bottom side and the position of the water surface, thereby judging whether the ship is in super-draught of navigation. A CN patent application No. 201320826218.1, entitled AUTOMATIC DETECTION APPARATUS OF SHIP DRAUGHT BASED ON SINGLE-BEAM SONAR ARRAY SCANNING TECHNIQUE, discloses that multiple sonar devices installed on an underwater elevated rail simultaneously transmit sonar signals vertically upward. When a ship passes by, the acoustic signal issued by the sonar device vertically overlapping with the hull area is reflected by the hull, the reflected acoustic signal is changed in the sonar spreading trajectory and is received by the sonar device, the distance from the ship to the sonar device can be calculated by using a measurement device, and the other sonar devices having the acoustic signal not reflected by the hull do not change in transmitting and receiving trajectories, the sonar signal is spread to the water surface and reflected from the water surface, the reflected signal is then received by the sonar device, and a distance from the water surface to the sonar device can be calculated by using a measurement device.

The defects of the above devices are that: in order to guarantee the accurate detection on the bottom edge of the ship, it is necessary to arrange the sonar receiving and transmitting devices densely as much as possible, and the overly dense arrangement of the sonar components may lead to crosstalk between the adjacent sonar components, thereby affecting the detection precision, and the devices have a high cost. In addition, because the sonar diffusion degree is proportional to the distance of the ship, a wider water area for measurement may cause the mutual interference between the adjacent sonars more easily, thus greatly reducing the measurement precision.

SUMMARY OF THE INVENTION

Technical Problem

The objective of the present invention is to provide a ship draught detection apparatus and its detection method, which address the technical problems in the prior art, including a high cost of the ship draught detection apparatus, and a low detection precision.

Technical Solution

To solve the above technical problem, the present invention adopts the following technical solutions:

A ship draught detection apparatus, for detecting a draught of a ship when passing a ship lock, comprising:

two servo motors, respectively disposed on the bank at two sides of the ship lock, wherein a connecting line between the two servo motors is perpendicular to the length direction of the ship lock.

a guide rail, disposed on the bottom of the ship lock, wherein two ends of the guide rail are respectively fixedly connected to two side walls of the ship lock, the guide rail is perpendicular to the length direction of the ship lock, a sonar detection device is slidably disposed on the guide rail, the sonar detection device comprises a base, a sonar transmitter head and a sonar receiver head, and the sonar transmitter head and the sonar receiver head are both vertically upward disposed on the base.

a traction device, comprising two ropes and two pulleys, wherein the two pulleys are fixed on the two ends of the guide rail, respectively. One end of one of the ropes is connected to an output shaft of one of the servo motors, the other end goes around the pulley at the corresponding side to be connected to one end of the sonar detection device. One end of the other rope is connected to an output shaft of the other servo motor, and the other end goes around the pulley at the corresponding side to be connected to the other end of the sonar detection device.

a locating device, disposed on the bank of the ship lock, for measuring distances between the ship and the two side walls of the ship lock when entering the ship lock.

a control device, disposed on the bank of the ship lock, wherein the control device is electrically connected to the locating device, the two servo motors and the sonar detection device, and is connected to an external power source.

Compared with the provision of a series of sonar detection devices in the prior art, the provision of one sonar detection device reduces the cost, and there is no mutual interference between adjacent sonars. Meanwhile, because a lock gate width of a ship lock is greater than a width of the ship, in order to improve the detection precision, the locating device is configured to predict in advance an accurate position of the ship when passing the ship lock according to the position of the ship and the orientation of a ship bow, and the control device controls the rotation speed and the rotation direction of the two servo motors, and makes the sonar detection device move along the guide rail through the traction of ropes. It is ensured that the sonar detection device is located just below the ship when the ship passes the ship lock, thereby improving the detection precision.

In a further improvement, the ship draught detection apparatus further includes two rollers, respectively disposed on the bank at the two sides of the ship lock, wherein each roller is coaxially connected to the output shaft of the servo motor at the corresponding side, and the one end of each of the two ropes is wound on the roller at the corresponding side, thereby facilitating the coiling and uncoiling of the ropes.

In a further improvement, the ship draught detection apparatus further includes a support, disposed above the ship lock, wherein the locating device is disposed on the support. The locating device is disposed above the ship lock, such that the position of the ship can be observed more accurately.

In a further improvement, the locating device is disposed at a center of the support, i.e., the locating device is located at a center of a width direction of the ship lock, thereby facilitating the determination of a position coordinate of the locating device.

In a further improvement, the locating device is a camera, disposed on a rotary platform, which is convenient for the shooting and the intuitive determination of the position of the ship and the scene around the ship, so as to facilitate the calculation of the actual position of the ship.

In a further improvement, the ship draught detection apparatus further includes an alarm device, electrically connected to the control device. By disposing the alarm device, when the draught of the ship exceeds an early warning value, the alarm device issues an alarm signal to prevent accidents.

In a further improvement, the ship draught detection apparatus further includes a display device, electrically connected to the control device. By disposing the display device, the detection result can be presented easily and directly.

A detection method for a ship draught detection apparatus includes the following steps:

1) detecting the position of a ship in the width direction of the ship lock: when the ship does not enter the ship lock, but has entered a detection range of the locating device, the locating device measures the position of the ship and the orientation of a ship bow at this moment, and then transmits measured data to the control device.

2) adjusting the position of the sonar detection device: after receiving the data of the locating device, the control device calculates position information of the ship when passing the ship lock according to the position of the ship and the orientation of the ship bow measured by the locating device, controls the rotation speed and direction of the two servo motors according to the calculation and makes the sonar detection device move along the guide rail through the traction of the ropes, thereby ensuring that the sonar detection device is located just below the ship when the ship passes the ship lock.

3) detecting the draught of the ship: when the ship passes the ship lock, the sonar detection device is located just below the ship, the sonar transmitter head of the sonar detection device transmits an acoustic wave that spreads vertically upward, the sonar receiver head receives an echo reflected from the bottom of the ship, and the control device calculates the distance between the ship bottom and the ship lock sill and the draught of the ship according to the time difference between the transmission of the acoustic wave and the receiving of the echo.

In a further improvement, the locating device measures the position of the ship and the orientation of the ship bow once per second, and transmits the measured data to the control device, and the control device receives the data of the locating device, calculates the position information of the ship when passing the ship lock according to the position of the ship and the orientation of the ship bow measured by the locating device, and constantly adjusts the position of the sonar detection device, such that it is ensured that the sonar detection device is located just below the ship bottom when the ship passes the ship lock, thereby improving the detection precision.

In a further improvement, when the ship passes the ship lock, the distance between the ship bottom and the ship lock sill and the draught of the ship are displayed on the display device, and when the draught of the ship exceeds an early warning value, the alarm device issues an alarm signal, so as to prevent the ship lock sill from being smashed due to the excessive overload of the ship.

Advantageous Effect

Compared with the prior art, the present invention has the following beneficial effects:

1. Compared with the provision of a series of sonar detection devices in the prior art, the provision of one movable sonar detection device in the present invention reduces the cost and there is no mutual interference between adjacent sonars.

2. The locating device is configured to determine in advance an accurate position of the ship when passing the ship lock according to the position of a ship and an orientation of a ship bow when located, and the control device controls the movement of the sonar detection device. It is ensured that the sonar detection device is located just below the ship when the ship passes the ship lock, thereby improving the detection precision.

3. The locating device measures the position of the ship and the orientation of the ship bow once per second, and the position of the sonar detection device is constantly adjusted by the control device, such that it is ensured that the sonar detection device is located just below the ship bottom when the ship passes the ship lock, thereby improving the detection precision.

4. By disposing the alarm device, when the draught of the ship exceeds an early warning value, the alarm device issues an alarm signal to prevent accidents of smashing the ship lock sill due to the excessive overload of the ship.

DETAILED DESCRIPTION OF THE INVENTION

To better understand the present invention, the content of the present invention is further illustrated below in connection with embodiments, but the content of the present invention is not only limited to the following embodiments.

Figure 1:
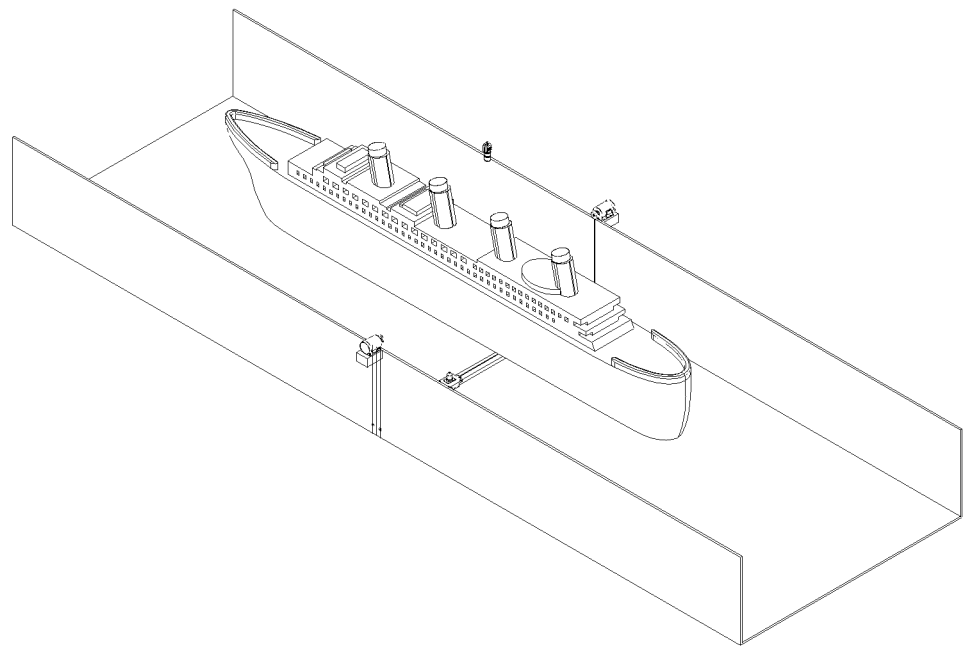
FIG. 1 is a structural diagram of a ship when passing a ship lock according to the present invention.
Figure 2:
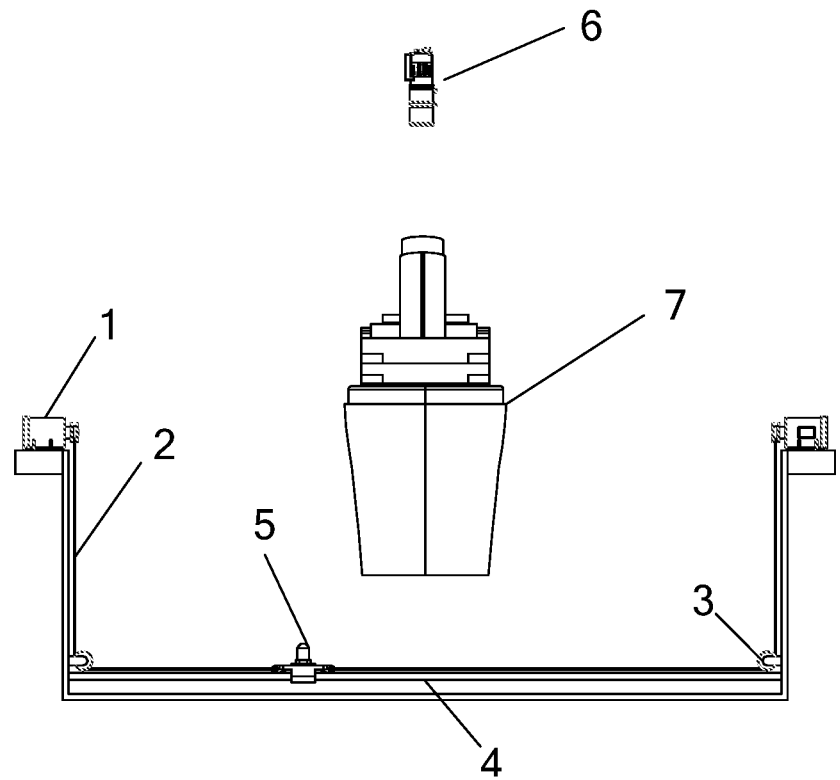
FIG. 2 is a structural diagram of a sonar detection device that has not been moved to be just below the ship bottom.
Figure 3:
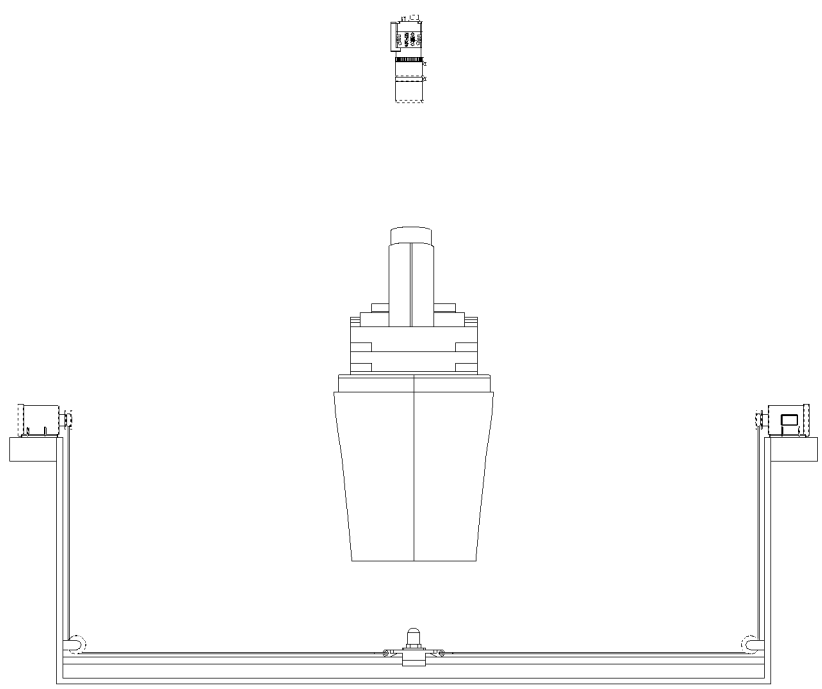
FIG. 3 is a structural diagram of the sonar detection device that is located just below the ship bottom.

FIGS. 1-3 shows a ship draught detection apparatus of the present invention, which cover the technical features including a servo motor 1, ropes 2, pulleys 3, a guide rail 4, a sonar detection device 5, a locating device 6, and a ship 7.

Embodiment 1

As shown in FIGS. 1-3, a ship draught detection apparatus, for detecting a draught of a ship when passing a ship lock, includes:

two servo motors 1, respectively disposed on the bank at two sides of the ship lock, wherein a connecting line between the two servo motors is perpendicular to a length direction of the ship lock.

a guide rail 4, disposed on the bottom of the ship lock, wherein two ends of the guide rail are respectively fixedly connected to two side walls of the ship lock, the guide rail is perpendicular to the length direction of the ship lock, a sonar detection device 5 is slidably disposed on the guide rail, the sonar detection device comprises a base and a sonar transmitter head and a sonar receiver head disposed on the base, and the sonar transmitter head and the sonar receiver head are both vertically upward disposed, namely, disposed toward the detected ship.

a traction device, comprising two ropes 2 and two pulleys 3, wherein the two pulleys are respectively fixedly disposed on the two ends of the guide rail, one end of one of the ropes is connected to an output shaft of one of the servo motors, the other end goes around the pulley at the corresponding side to be connected to one end of the sonar detection device; one end of the other rope is connected to an output shaft of the other servo motor, and the other end goes around the pulley at the corresponding side to be connected to the other end of the sonar detection device.

a locating device 6, disposed on the bank of the ship lock, for measuring distances of the ship to the two side walls of the ship lock when entering the ship lock. A control device, disposed on the bank of the ship lock, wherein the control device is electrically connected to the locating device, the two servo motors and the sonar detection device, and is connected to an external power source.

Compared with the provision of a series of sonar detection devices in the prior art, the provision of one sonar detection device reduces the cost, without mutual interference between adjacent sonars. Meanwhile, because a lock gate width of a ship lock is greater than a width of the ship, in order to improve the detection precision, the locating device is configured to determine in advance an accurate position of the ship when passing the ship lock according to a position of the ship and an orientation of a ship bow when located. The control device controls a rotation speed and a rotation direction of the two servo motors, and makes the sonar detection device move along the guide rail through the traction of ropes, such that the sonar detection device is located just below the ship when the ship passes the ship lock, thereby improving the detection precision.

In the present embodiment, the ship draught detection apparatus further includes two rollers, respectively disposed on the bank at the two sides of the ship lock, wherein each roller is coaxially connected to the output shaft of the servo motor at the corresponding side, and the one end of each of the two ropes is wound on the roller at the corresponding side, thereby facilitating the coiling and uncoiling of the ropes.

In the present embodiment, the ship draught detection apparatus further includes a support, disposed above the ship lock, wherein the locating device is disposed on the support.

The locating device is disposed above the ship lock, such that the position of the ship can be observed more accurately.

In the present embodiment, the locating device is disposed at a center of the support, i.e., the locating device is located at a center of a width direction of the ship lock, thereby facilitating the determination of a position coordinate of the locating device.

In the present embodiment, the locating device is a camera, disposed on a rotary platform, which is convenient for the shooting and the intuitive determination of the position of the ship and the scene around the ship, so as to facilitate the calculation of the current position of the ship.

In the present embodiment, the ship draught detection apparatus further includes an alarm device, electrically connected to the control device. By disposing the alarm device, when the draught of the ship exceeds an early warning value, the alarm device issues an alarm signal to prevent accidents.

In the present embodiment, the ship draught detection apparatus further includes a display device, electrically connected to the control device. By disposing the display device, the detection result can be presented easily and directly.

Embodiment 2

A detection method for a ship draught detection apparatus, which includes the following steps:

1) detecting the position of the ship in the width direction of the ship lock: when the ship does not enter the ship lock, but has entered a detection range of the locating device, the locating device measures the position of the ship and the orientation of a ship bow at this moment, and then transmits measured data to the control device;

2) adjusting the position of the sonar detection device: after receiving the data of the locating device, the control device calculates position information of the ship when passing the ship lock according to the position of the ship and the orientation of the ship bow measured by the locating device, controls the rotation speed and the rotation direction of the two servo motors according to the calculation result, and makes the sonar detection device move along the guide rail through the traction of the ropes, thereby ensuring that the sonar detection device is located just below the ship when the ship passes the ship lock;

3) detecting the draught of the ship: when the ship passes the ship lock, the sonar detection device is located just below the ship, as shown in FIG. 3, the sonar transmitter head of the sonar detection device transmits an acoustic wave spreading vertically upward, the sonar receiver head receives an echo reflected from the bottom of the ship, and the control device calculates the distance between the ship bottom and the ship lock sill and the draught of the ship according to the time difference between the transmission of the acoustic wave and the receipt of the echo.

In the present embodiment, the locating device measures the position of the ship and the orientation of the ship bow once per second, and transmits the measured data to the control device, and the control device receives the data of the locating device, calculates the position information of the ship when passing the ship lock according to the position and constantly adjusts the position of the sonar detection device, such that the sonar detection device is located just below the ship bottom when the ship passes the ship lock, thereby improving the detection precision.

In the present embodiment, when the ship passes the ship lock, the distance between the ship bottom and the ship lock sill and the draught of the ship are displayed on the display device, and when the draught of the ship exceeds an early warning value, the alarm device issues an alarm signal, so as to prevent the ship lock sill from being smashed due to the overly large load of the ship.

Those not particularly described in the present invention all belong to the existing techniques or may be implemented by the existing techniques, and the specific embodiments in the present invention are merely preferred embodiments of the present invention, and are not intended to limit the implementation scope of the present invention. Any equivalent change and modification made in accordance with the content of the claims of the present invention would fall within the technical scope of the present invention.

What is claimed is:

1. A ship draught detection apparatus, for detecting the draught of a ship when passing a ship lock, comprising:
    a) two servo motors, respectively disposed on the bank at two sides of the ship lock, wherein a connecting line between the two servo motors is perpendicular to the length direction of the ship lock;
    b) a guide rail, disposed on the bottom of the ship lock, wherein two ends of the guide rail are fixed on two side walls of the ship lock, respectively; and wherein the guide rail is perpendicular to the length direction of the ship lock;
    c) a sonar detection device slidably disposed on the guide rail, wherein the sonar detection device comprises a base, a sonar transmitter head and a sonar receiver head, wherein the sonar transmitter head and the sonar receiver head are both vertically upward disposed on the base;
    d) a traction device comprising two ropes and two pulleys, wherein the two pulleys are respectively fixedly disposed on the two ends of the guide rail, one end of one of the ropes is connected to an output shaft of one of the servo motors, the other end goes around the pulley at the corresponding side to be connected to one end of the sonar detection device; and wherein one end of the other rope is connected to an output shaft of the other servo motor, and the other end goes around the pulley at the corresponding side to be connected to the other end of the sonar detection device;
    e) a locating device, disposed on the bank of the ship lock, for measuring distances of the ship to the two side walls of the ship lock when entering the ship lock; and
    f) a control device, disposed on the bank of the ship lock, wherein the control device is electrically connected to the locating device, the two servo motors and the sonar detection device, and is connected to an external power source.

2. The ship draught detection apparatus according to claim 1, further comprising two rollers, respectively disposed on the bank at the two sides of the ship lock, wherein each roller is coaxially connected to the output shaft of the servo motor at the corresponding side, and the one end of each of the two ropes is wound on the roller at the corresponding side.

3. The ship draught detection apparatus according to claim 1, further comprising a support, disposed above the ship lock, wherein the locating device is disposed on the support.

4. The ship draught detection apparatus according to claim 3, wherein the locating device is disposed at a center of the support in a width direction of the ship lock.

5. The ship draught detection apparatus according to claim 3, wherein the locating device is a camera, disposed on a rotary platform.

6. The ship draught detection apparatus according to claim 1, further comprising an alarm device, electrically connected to the control device.

7. The ship draught detection apparatus according to claim 1, further comprising a display device, electrically connected to the control device.

8. A detection method for the ship draught detection apparatus according to claim 1, comprising the following steps:
    1) detecting a position of the ship in the width direction of the ship lock, wherein the locating device measures the position of the ship and the orientation of a ship bow at this point, and transfers measured data to the control device;
    2) adjusting a position of the sonar detection device, wherein the control device calculates position information of the ship when passing the ship lock according to the position of the ship and the orientation of the ship bow measured by the locating device, controls the rotation speed and the rotation direction of the two servo motors according to the calculation result, and makes the sonar detection device move along the guide rail through the traction of the ropes, thereby ensuring that the sonar detection device is located just below the ship when the ship passes the ship lock; and
    3) detecting the draught of the ship, wherein the sonar transmitter head of the sonar detection device located just below the ship transmits an acoustic wave spreading vertically upward, and wherein the sonar receiver head receives an echo reflected from the bottom of the ship, and the control device calculates the distance between the ship bottom and the ship lock sill and the draught of the ship according to a time difference between the transmission of the acoustic wave and the receipt of the echo.

9. The detection method according to claim 8, wherein the locating device measures the position of the ship and the orientation of the ship bow once per second, and transmits the measured data to the control device, and the control device receives the data of the locating device, calculates the position information of the ship when passing the ship lock according to the position of the ship and the orientation of the ship bow measured by the locating device, and constantly adjusts the position of the sonar detection device, thereby ensuring that the sonar detection device is located just below the ship bottom when the ship passes the ship lock.

10. The detection method according to claim 8, wherein when the ship passes the ship lock, a distance between the ship bottom and the ship lock sill and the draught of the ship are displayed on a display device, and when the draught of the ship exceeds an early warning value, an alarm device issues an alarm signal.

* * * * *